United States Patent [19]

Monroe et al.

[11] Patent Number: 5,532,298
[45] Date of Patent: Jul. 2, 1996

[54] DEGRADABLE AGRICULTURAL MAT

[75] Inventors: Stephen H. Monroe, Memphis, Tenn.; James A. Goettmann; Gerald A. Funk, both of North East, Pa.

[73] Assignee: International Paper, Tuxedo Park, N.Y.

[21] Appl. No.: 386,487

[22] Filed: Feb. 10, 1995

[51] Int. Cl.$^6$ ............................... C08L 1/00; B32B 5/10
[52] U.S. Cl. ................ 524/13; 524/31; 524/35; 428/74; 428/105; 428/224; 428/281; 428/288; 428/311.7; 428/390; 523/124; 523/128
[58] Field of Search .................. 524/13, 31, 35; 523/124, 128; 428/165, 288, 281, 311.7, 74, 224, 390

[56] References Cited

U.S. PATENT DOCUMENTS

| | | | |
|---|---|---|---|
| 3,998,006 | 12/1976 | Riedel | 47/32 |
| 4,214,034 | 7/1980 | Kodera et al. | 428/315 |
| 4,283,880 | 8/1981 | Fjeldsa | 47/9 |
| 4,481,075 | 11/1984 | Dailly et al. | 162/145 |
| 4,481,242 | 11/1984 | Fletcher | 428/136 |
| 4,538,531 | 9/1985 | Wong | 47/9 |
| 4,790,907 | 12/1988 | Mallen et al. | 162/157.1 |
| 4,818,585 | 4/1989 | Shipp, Jr. | 47/9 |
| 4,867,526 | 9/1989 | Arroyo | 350/96.23 |
| 4,896,453 | 1/1990 | Jacob | 47/9 |
| 4,920,692 | 5/1990 | Kitamura et al. | 47/9 |
| 5,009,033 | 4/1991 | McCray | 47/9 |
| 5,021,285 | 6/1991 | Ohe et al. | 47/19 |
| 5,076,008 | 12/1991 | Arroyo | 47/19 |
| 5,090,154 | 2/1992 | Jacob | 47/9 |
| 5,160,582 | 11/1992 | Takahashi | 162/117 |
| 5,163,247 | 11/1992 | Weber et al. | 47/9 |
| 5,191,734 | 3/1993 | Weber et al. | 47/9 |
| 5,308,906 | 5/1994 | Taylor et al. | 524/398 |
| 5,382,610 | 1/1995 | Harada et al. | 524/13 |

FOREIGN PATENT DOCUMENTS

| | | | |
|---|---|---|---|
| 0180648 | 11/1982 | Japan | 524/13 |
| 2028500 | 2/1987 | Japan | 524/13 |

*Primary Examiner*—Paul R. Michl
*Assistant Examiner*—Olga Asinovsky
*Attorney, Agent, or Firm*—Stewart L. Gitler; Martin P. Hoffman; Michael J. Doyle

[57] ABSTRACT

A degradable agricultural ground cover which is composed of high density polyethylene polymer fiber and cellulose pulp which is 100% photo and biodegradable for use in weed control and moisture retention in soil. The unique agricultural mat or cover lasts 8–12 weeks before serious photo and biodegradability occurs, while allowing crop plants sufficient time to mature and produce. The sheet totally disappears with plowing and tilling, becoming a soil extender until complete degradation occurs.

8 Claims, No Drawings

DEGRADABLE AGRICULTURAL MAT

BACKGROUND OF THE INVENTION

This invention relates to an agricultural mat or ground covering with weed control and moisture control properties. The moisture and weed control properties equal that of an extruded high density polyethylene film with the added benefit of 100% photo and biodegradability.

Present day horticulture for growing field crops varies greatly based on climatic conditions, soil conditions, and types of crops being planted. State-of-the-art techniques being practiced widespread involve the use of a ground mat primarily used for weed control and moisture retention in the soil.

Examples of ground mats used for these purposes can be categorized into two categories. The first and most widely used is a mat produced from extruded high density polyethylene. The mat may or may not contain pigmentation to give the fabric opacity. High opacity is necessary in weed control. The closed high density polyethylene mat acts as an excellent moisture barrier for retaining water in the soil.

The high density polyethylene film is non-degradable and must either be physically removed from the field after harvest or it can be tilled under. Tilling the film under is less satisfactory because it tends not to disperse in the soil but remains for many seasons in long, wide strips which interfere with cultivation in following seasons.

A second type of fabric agricultural matting has been produced from 100% cellulosic fibers. This mat contains black pigment for opacity and is totally retillable after harvest, leaving no residual fabric. The cellulose structure is 100% biodegradable with the exception of the black pigment. This particular mat biodegrades too quickly in areas with extended single growing seasons. The mat is deficient in that it breaks apart before the crops are ripe and allows some weed plants to compete with the crop plants. In addition, the mat does an inefficient job of retaining ground moisture.

U.S. Pat. No. 5,021,285, Ohe et al, proposes a nonwoven sheet for agricultural use made of a hydrophobic non-woven fabric subjected to hydrophilic treatment in which a surfactant is applied to at least part of the surface of the hydrophobic non-woven fabric, the sheet being characterized in that the hydrophilic treatment creates channels that allow water to pass through the obverse surface of the non-woven fabric to the underside thereof and in that the percentage of water retention is within the range of 150–300 wt %. The polymer nature of the fabric prevents same from degrading and as such, such a sheet encounters the same problems as a high density polyethylene polymer matting cover.

U.S. Pat. No. 4,818,585, Ship, Jr., discloses an agricultural protective fabric comprised of two layers of a nondegradable material and a degradable melt blown layer. The fabric is essentially a cover for growing plants and such fabric allows the transmission of air, water and light.

The inventive new agricultural ground cover or mat embodied by the invention combines both the longevity of a film, the moisture holding qualities of a film, along with the degradability of pure cellulose.

SUMMARY OF THE INVENTION

The present invention relates to an agricultural ground cover or mat with weed control and moisture control properties as good as an extruded pure polymer film such as high density polyethylene. The agricultural mat or cover is 100% photo and biodegradable. The material lasts from 8–12 weeks before serious photo and biodegradability occurs, allowing the crops time to mature and produce before losing the effect of the mat. Weed control is as good with this material as with an extruded high density polyethylene web as is moisture control and no leachates are solubilized from the sheet into the ground water. The sheet totally disappears with plowing and tilling, becoming a soil extender until complete degradation occurs.

It is therefore an object of the present invention to provide an agricultural ground cover or mat which will have sufficient strength and barrier properties while also having a sufficient degree of photo and biodegradability.

DETAILED DESCRIPTION OF THE INVENTION

While the invention will be described in connection with a preferred embodiment, it will be understood that it is not intended to limit the invention to that embodiment. Related alternatives, modifications, and equivalents as may be included within the spirit and scope of the invention as defined by the appended claims are contemplated.

The invention is directed to an agricultural ground cover or mat which can last from 8–12 weeks. The mat is composed of cellulose pulp and fibers produced from high density polyethylene. The materials are blended as a homogeneous mixture in water. If desired, a definitive amount of a water holdout material can be added. Water holdout materials standard to the art of papermaking such as an alkene ketene dimer (akd), ASA, or epichlorohydrin can be used. The agricultural mat or ground cover can be prepared on standard papermaking equipment.

The ratio of cellulose pulp to high density polyethylene fibers may vary. Cellulose pulp content can range between 80% to as low as 20% with the complimenting polymer component ranging from 20% to as high as 80%.

The cellulose pulp component may be any bleached or unbleached Southern, Northern, Canadian, etc., Hardwood, Softwood, cotton, or eucalyptus-type material. The cellulose may be either refined or unrefined.

The synthetic fiber content may be any fiber produced from a polymeric material such as high density polyethylene, low density polyethylene, polypropylene or polyethylene terephthalate. In addition, as stated, the ratio of cellulose to synthetic fibers may vary from 80/20 to 20/80.

Further, the basis weight of the resulted material may range from 20 lbs. per 3000 square feet to 150 lbs. per 3000 square feet.

In addition, if desired, the unique aqueous mixture may include pigments or dyes to elevate the desired degree of opacity.

The unique agricultural ground cover or mat performs comparably to a homogeneous extruded high density polyethylene mat while being completely tillable and degradable after one growing season. No leachates are present in this product.

A preferred embodiment of the invention can contain 25% high density polyethylene pulp or fiber, 74.25% unbleached Northern Hardwood cellulose, and 0.75% alkene ketene dimer water holdout material. High density polyethylene pulps such as Mitsui Fibrel E-400 PE pulp produced by Mitsui Petrochemical of Tokyo, Japan or DuPont PG-3 PE pulp produced by DuPont de Neumours Inc. of Wilmington, Del. are two possible materials which were utilized in preparing the unique mat or cover. Further, an unbleached Northern Hardwood pulp produced by the Thilmany Division of International Paper of Memphis, Tennessee was utilized as the cellulose pulp component. Lastly, one can utilize, if desired, Hercon 75 AKD Synthetic Size produced by Hercules Inc. of Wilmington, Del. as the alkene ketene dimer for the water holdout material component.

What is claimed is:

1. A degradable agricultural mat comprised of an aqueous mixture of 20 to 80 percent polymer fibers, 80 to 20 percent cellulose pulp and a water holdout material selected from the group consisting of an alkene ketene dimer, an epichlorohydrin and an alkenyl succinic anhydride.

2. A degradable agricultural mat as claimed in claim 1, wherein said polymer fibers are high density polyethylene fibers, low density polyethylene fibers, polypropylene fibers, or polyethylene terephthalate fibers.

3. A degradable agricultural mat as claimed in claim 1, wherein said cellulose pulp is refined or unrefined cellulose pulp.

4. A degradable agricultural mat as claimed in claim 1, wherein said cellulose pulp is bleached or unbleached cellulose pulp.

5. A degradable agricultural mat as claimed in claim 1, wherein said cellulose pulp is hardwood, softwood, cotton or eucalyptus cellulose pulp.

6. A degradable agricultural mat as claimed in claim 1, wherein the basis weight of said agricultural mat is from 20 lb/3000 $ft^2$.

7. A degradable agricultural mat as claimed in claim 1, further comprising a pigment or dye.

8. A degradable agricultural mat comprising an aqueous mixture of 25 percent high density polyethylene polymer fibers, 74.25 percent unbleached hardwood cellulose pulp fiber and 0.25 percent alkene ketene dimer.

* * * * *